United States Patent [19]
Coleman

[11] Patent Number: 5,392,796
[45] Date of Patent: Feb. 28, 1995

[54] APPARATUS FOR FLUSHING AN AUTOMATIC TRANSMISSION COOLING SYSTEM

[76] Inventor: Larry E. Coleman, 466 Union Ave., Memphis, Tenn. 38103

[21] Appl. No.: 224,702

[22] Filed: Apr. 8, 1994

Related U.S. Application Data

[62] Division of Ser. No. 130,779, Oct. 4, 1993.

[51] Int. Cl.$^6$ .............................................. B08B 3/04
[52] U.S. Cl. .................... 134/102.2; 134/169 A; 123/198 A
[58] Field of Search ........... 134/169 A, 168 R, 167 R, 134/166 R, 102.2; 123/198 A, 138 R

[56] References Cited

U.S. PATENT DOCUMENTS

| | | | |
|---|---|---|---|
| 2,510,701 | 6/1950 | Cross | 134/22.19 |
| 3,180,759 | 4/1965 | Falk | 134/22.18 |
| 3,431,145 | 3/1969 | Riley | 134/166 R |
| 4,059,858 | 11/1977 | Lambel et al. | 134/166 C |
| 4,412,551 | 11/1983 | Peters et al. | 134/104 |
| 4,551,181 | 11/1985 | Stearman | 134/22.11 |
| 4,553,587 | 11/1985 | Traylor | 165/95 |
| 4,911,211 | 3/1990 | Anderson | 134/169 A |
| 4,920,996 | 5/1990 | Flanner | 134/22.11 |
| 5,015,301 | 5/1991 | Baylor | 134/22.12 |
| 5,021,096 | 6/1991 | Abadi | 134/22.14 |
| 5,035,516 | 7/1991 | Pacheco | 134/200 |
| 5,094,757 | 5/1992 | Light | 134/22.11 |
| 5,103,878 | 4/1992 | Cassia | 134/169 |

OTHER PUBLICATIONS

APD Transmission Parts, "APD presents the 'Pulsator'", *Transmission Digest* (Jul. 1993).
Racoon Industries, "What Took So Long", *Transmission Digest* (May, 1993).
Glassinger & Co., "Cooler/Converter Flusher" (Aug. 1993).

*Primary Examiner*—Frankie L. Stinson
*Attorney, Agent, or Firm*—Walker, McKenzie & Walker

[57] ABSTRACT

A method and apparatus for flushing an automatic transmission cooling system. A sealed pressurized canister having an outlet and no inlet and a biodegradable soap solution thereinside is coupled to the cooling system, and a valve releases the soap within the canister through the cooling system. A tube within the canister extends from the canister's outlet into the soap solution, and after the soap is expelled from the canister, the canister is inverted and pressurized air from the canister purges the soap solution from the cooling system. A bag may be provided to catch the waste soap solution emerging from the cooling system.

13 Claims, 1 Drawing Sheet

APPARATUS FOR FLUSHING AN AUTOMATIC TRANSMISSION COOLING SYSTEM

CROSS-REFERENCE TO RELATED APPLICATION

This application is a division of my still pending application Ser. No. 08/130,779, filed Oct. 4, 1993, entitled "Apparatus and Method for Flushing an Automatic Transmission Cooling System".

BACKGROUND OF THE INVENTION

1. Field of the Invention

The present invention relates, in general, to the servicing of automatic transmissions for vehicles, and in particular, to an apparatus and method for flushing a vehicle's automatic transmission cooling system.

2. Information Disclosure Statement

Vehicular automatic transmissions are well-known, and typically are interconnected with a cooling system for cooling the automatic transmission hydraulic fluid that circulates within the transmission. Most such cooling systems include a cooler within the bottom of the vehicle's radiator, immersed in circulating water therein, so that the cooled circulating water within the radiator cools the transmission fluid that circulates from the transmission, through the cooler, and back to the transmission. The transmission fluid typically flows through a fine metal weave within the cooler, thereby transferring heat from the fluid to the weave and subsequently into the cooling water surrounding the cooler within the radiator.

However, when a vehicle's automatic transmission fails, fine metal particles are released into the circulating transmission fluid and become trapped in the transmission cooling system's cooler, usually within the fine metal weave. These metallic particles must be flushed from the transmission cooling system before a repaired or replacement transmission is installed, lest the particles circulate back into the new transmission with the new transmission's cooling fluid, thereby contaminating the new transmission and causing it to fail within a short period of time.

It is therefore desirable to have an apparatus and method for flushing a vehicle's automatic transmission cooling system.

Heretofore, the fluid lines that interconnect the cooling system to the automatic transmission have been connected during flushing to various pumps, air compressors, or the like, and mineral spirits have been pumped through the cooling system to flush the metal particles therefrom. However, pumping equipment or air compressors for performing such a flushing operation are typically only found in transmission service shops, and are unavailable for small shops or the "do-it-yourself" auto mechanic. Additionally, increased concern for the environment has created an awareness of the hazards of dumping chemical solutions (as might be employed in prior flushing methods) into the sewage system.

It is therefore desirable to have an apparatus and method for flushing a vehicle's automatic transmission cooling system that is inexpensive and disposable, that uses no chemical flushing agents that might harm the environment, and that requires no attachment to pumping machinery, air compressors, or the like.

A preliminary patentability search in Class 165, subclass 5, and Class 134, subclasses 22.11 and 22.14, produced the following patents, some of which may be relevant to the present invention: Stearman, U.S. Pat. No. 4,551,181, issued Nov. 5, 1985; Flanner, U.S. Pat. No. 4,920,996, issued May 1, 1990; Baylor et al., U.S. Pat. No. 5,015,301, issued May 14, 1991; Abadi, U.S. Pat. No. 5,021,096, issued Jun. 4, 1991; and Light, U.S. Pat. No. 5,094,757, issued Mar. 10, 1992.

Additionally, APD Transmission Parts, Atlanta, Ga., is known to market a transmission cooler and line flusher under the tradename "PULSATOR" that mixes compressed air from a compressor with solvent to blast away contaminants from transmission cooling systems, as described in an advertisement in *Transmission Digest* (Jul. 1993). Raccoon Industries is known to market a transmission cooler and line flusher, as described in an advertisement in *Transmission Digest* (May 1993), that flushes the cooling system with heated automatic transmission fluid as pumped from a large drum by an electric pump motor. Glassinger & Company is known to market a transmission cooling system flusher that pumps a solvent from a twenty-gallon tank by an electric pump motor, as advertised in *Transmission Digest* (Aug. 1993). None of these documents or patents disclose or suggest the present invention.

During the prosecution of the parent to this application, the Examiner cited the following additional patents: Cross, U.S. Pat. No. 2,510,701, issued Jun. 6, 1950; Falk, U.S. Pat. No. 3,180,759, issued Apr. 27, 1965; Peters et al., U.S. Pat. No. 4,412,551, issued Nov. 1, 1983; and Traylor, U.S. Pat. No. 4,553,587, issued Nov. 19, 1985.

SUMMARY OF THE INVENTION

The present invention is a method and apparatus for flushing a vehicle's automatic transmission cooling system of metal particles as might accumulate within the cooling system when the vehicle's automatic transmission fails. The cooling system is disconnected from the transmission and a pressurized canister with a soap solution is connected to the cooling system. The soap solution is flushingly released through the cooling system, and then the cooling system is purged with compressed air from the canister after the soap flushing is completed.

It is an object of the present invention to provide an inexpensive method and disposable apparatus for flushing a vehicle's automatic transmission cooling system without the use of chemical flushing agents that might harm the environment. It is a further object that the apparatus be self-contained, and require no attachment to pumping machinery, air compressors, or the like.

DESCRIPTION OF THE PREFERRED EMBODIMENT

Figure 1:
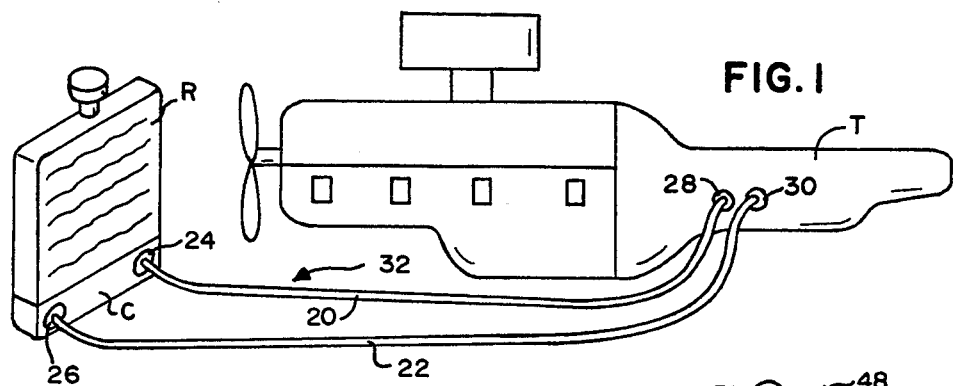
FIG. 1 is a somewhat schematic view of a vehicle's automatic transmission interconnected with a well-known automatic transmission cooler.

FIG. 1 is a somewhat schematic view of a prior-art vehicle's automatic transmission T interconnected with a well-known automatic transmission cooler C at the bottom of the vehicle's radiator R. Hydraulic lines 20 and 22 allow hydraulic transmission fluid to circulate between cooler C and transmission T, and lines 20 and 22 are typically connected to cooler C using well-known threaded fittings 24 and 26, respectively, and to transmission T using similar well-known threaded fittings 28 and 30. Fittings 28 and 30 shall respectively be understood to be first and second ports into and out of the cooling system 32 comprising cooler C and lines 20 and 22 attached thereto.

Those skilled in the art will understand that cooler C typically includes passageways therein with a fine metal weave through which the flowing transmission fluid passes, thereby conducting heat from the flowing fluid into the surrounding cooling water of the radiator. Such construction is well-known. When the transmission T is repaired, lines 20 and 22 are disconnected from transmission T as by unscrewing fittings 28 and 30 from transmission T in a manner well-known to those skilled in the art.

Figure 2:
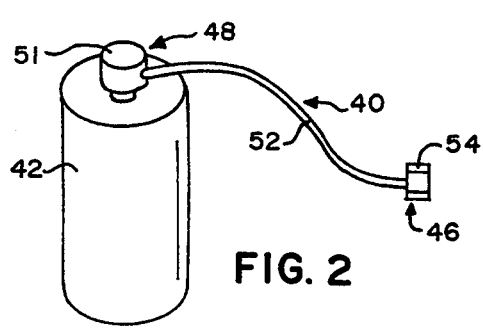
FIG. 2 is a view of the canister of the present invention.
Figure 3:
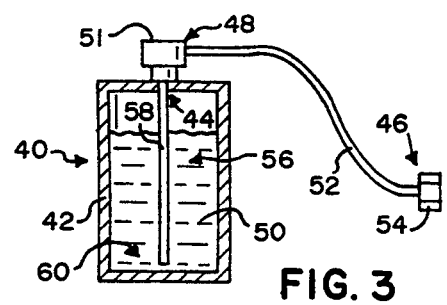
FIG. 3 is a sectional view of the canister of the present invention showing the feed tube and soap solution thereinside.

Referring to FIGS. 2-3, flushing apparatus 40 is seen to comprise a sealed pressurized canister 42 having an outlet 44 and no inlet, coupling means 46 adapted for sealingly connecting outlet 44 to the transmission cooling system 32 in a manner hereinafter described, and valve means 48 for selectively placing coupling means 46 in communication with the interior of canister 42 by sealing and unsealing outlet 44.

Canister 42 has a well-known soap solution 50 therein, preferably biodegradable and preferably two-thirds filled with soap solution 50, and is internally pressurized substantially above atmospheric pressure, preferably to a pressure of ninety pounds per square inch (PSI).

Valve means 48 is well-known to those skilled in the art, and is preferably pushbutton-actuated so as to sealingly close outlet 44 when pushbutton 51 is not depressed and so as to unsealingly open outlet 44 when pushbutton 51 is depressed or actuated.

Flushing apparatus 40 preferably includes a hose 52, preferably flexible, interposed between coupling means 46 and outlet 44, and coupling means 46 preferably includes a well-known threaded hydraulic coupling 54 adapted for sealingly mating with threaded fittings 28 and 30 in a manner similar to that in which fittings 28 and 30 connect to transmission T.

The interior 56 of canister 42 preferably includes a tube 58 therein extending from outlet 44 to a region 60 within the interior 56 of canister 42 remote from outlet 44. In the preferred embodiment, outlet 44 is at or near the top of canister 42, and tube 58 extends through the interior 56 of canister 42 to region 60 near the bottom of canister 42.

The present invention also preferably includes a container, such as a disposable plastic bag 62, for receiving the discharge of soap flushant solution, forced through the transmission cooling system 32 by apparatus 40, that emerges from second port or coupling 30 during the operation of the present invention as hereinafter described.

Figure 4:
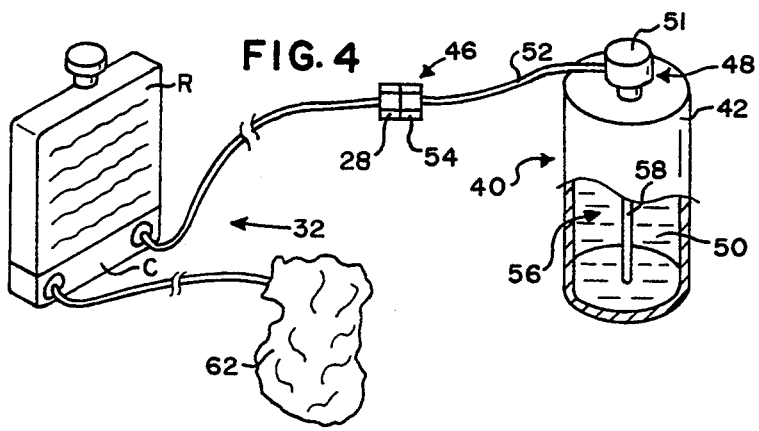
FIG. 4 shows the present invention interconnected with a vehicle's automatic transmission cooling system in preparation for flushing the cooling system with a soap solution.
Figure 5:
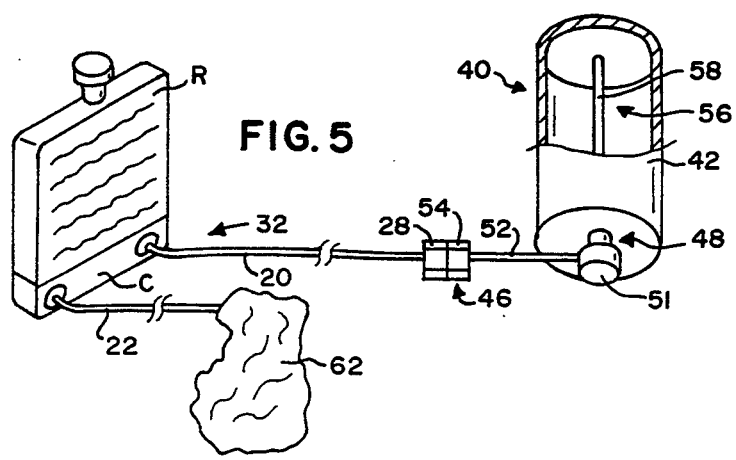
FIG. 5 is similar to FIG. 4, except with the canister inverted during the air purging of the soap solution from the flushed cooling system.

The method and use of the present invention are practiced as shown in FIGS. 4 and 5. First, cooling system 32 is connected to a pressurized source of soap solution such as apparatus 40. Then, soap solution 50 is caused to flow through cooling system 32. Finally, soap solution 50 is purged from the cooling system 32 by blowing pressurized air through the cooling system 32.

Preferably, the method and use of the present invention are practiced by the steps comprising: connecting the cooling system 32 to an outlet 44 of a pressurized canister 42 with a soap solution 50 thereinside, with canister 42 having a tube 58 thereinside extending from outlet 44, and with canister 42 including a valve means 48 for selectively sealing outlet 44; positioning canister 42 so that tube 58 terminates within soap solution 50 and thereby places outlet 44 in communication with soap solution 50 as shown in FIG. 4; then opening valve means 48 so that soap solution 50 is allowed to flow through outlet 44 into and through cooling system 32; then, inverting canister 42 as shown in FIG. 5 so that tube 58 no longer terminates within soap solution 50; then, purging the soap solution 50 from cooling system 32 by allowing pressurized air from within canister 42 to flow through outlet 44 and through cooling system 32. As previously explained, canister 42 may be connected to the first port or threaded fitting 28 of cooling system 32 by coupling means 46 including threaded hydraulic coupling 54.

The method and use of the present invention may also include, before the step of opening valve means 48, the preparatory steps of first filling canister 42 with soap solution 50, preferably two-thirds of the way full, then pressurizing canister 42 to an internal pressure substantially above atmospheric pressure, preferably to a pressure of ninety pounds per square inch (PSI).

The method and use of the present invention preferably also include the step of inserting the second port or threaded fitting 30 of cooling system 32 into container or plastic bag 62 so as to thereby receive the emerging flushant soap from cooling system 32 for later disposal. If desired, bag 62 could have well-known closure means such as a drawstring (not shown) for sealing the mouth of bag 62 about fitting 30 during flushing and afterwards for tightly sealing the mouth of bag 62 for subsequent disposal.

Although the present invention has been described and illustrated with respect to a preferred embodiment and a preferred use therefor, it is not to be so limited since modifications and changes can be made therein which are within the full intended scope of the invention.

I claim:

1. An apparatus for flushing an automatic transmission cooling system having a first port and a second port and including a fine metal weave therein through which hydraulic fluid flows, said apparatus comprising:
    (a) a disposable sealed pressurized canister having an outlet and no inlet, said canister having a soap solution therein and being internally pressurized substantially above atmospheric pressure;
    (b) coupling means including a hydraulic coupling adapted for sealingly connecting said outlet to the first port of the automatic transmission cooling system; and (c) valve means for selectively placing said coupling means in communication with the interior of said canister.

2. The apparatus as recited in claim 1, in which the interior of said canister includes a tube therein extending from said outlet to a region within the interior of said canister remote from said outlet.

3. The apparatus as recited in claim 1, in which said soap solution is biodegradable.

4. The apparatus as recited in claim 1, in which said apparatus further includes a hose interposed between said hydraulic coupling and said outlet.

5. The apparatus as recited in claim 4, in which the interior of said canister includes a tube therein extending from said outlet to a region within the interior of said canister remote from said outlet.

6. The apparatus as recited in claim 5, in which said soap solution is biodegradable.

7. In combination: an automatic transmission cooling system having a first port and a second port and including a fine metal weave therein through which hydraulic fluid flows; and an apparatus for flushing said automatic transmission cooling system, said apparatus comprising:

(a) a disposable sealed pressurized canister having an outlet and no inlet, said canister having a soap solution therein and being internally pressurized substantially above atmospheric pressure;

(b) coupling means including a threaded hydraulic coupling for sealingly connecting said outlet to said first port; and (c) valve means for selectively placing said coupling means in communication with the interior of said canister.

8. The combination as recited in claim 7, in which the interior of said canister includes a tube therein extending from said outlet to a region within the interior of said canister remote from said outlet for supplying the soap solution pressurized at approximately 90 PSI.

9. The combination as recited in claim 7, in which said soap solution is biodegradable.

10. The combination as recited in claim 7, in which said apparatus further includes a hose interposed between said threaded hydraulic coupling and said outlet.

11. The combination as recited in claim 10, in which the interior of said canister includes a tube therein extending from said outlet to a region within the interior of said canister remote from said outlet.

12. The combination as recited in claim 11, in which said soap solution is biodegradable.

13. The combination as recited in claim 7, further including a container into which said second port empties.

* * * * *